United States Patent
Nakai

(10) Patent No.: US 6,324,013 B1
(45) Date of Patent: Nov. 27, 2001

(54) COLLIMATOR LENS AND OPTICAL SCANNING DEVICE WHICH USES IT

(75) Inventor: Yoko Nakai, Yono (JP)

(73) Assignee: Fuji Photo Optical Co., Ltd., Omiya (JP)

(*) Notice: Subject to any disclaimer, the term of this patent is extended or adjusted under 35 U.S.C. 154(b) by 0 days.

(21) Appl. No.: 09/660,879

(22) Filed: Sep. 13, 2000

(30) Foreign Application Priority Data

Sep. 14, 1999 (JP) ................................................. 11-260801

(51) Int. Cl.$^7$ .................................................. G02B 27/30
(52) U.S. Cl. ................................................ 359/641; 359/793
(58) Field of Search ..................................... 359/197, 212, 359/216, 217, 218, 219, 206, 207, 793, 795, 641

(56) References Cited

U.S. PATENT DOCUMENTS

| | | | |
|---|---|---|---|
| 5,270,851 | * 12/1993 | Makino | 359/206 |
| 5,691,847 | 11/1997 | Chen . | |
| 5,838,480 | * 11/1998 | McIntyre | 359/205 |
| 5,838,497 | * 11/1998 | Maruyama | 359/565 |
| 5,978,132 | 11/1999 | Ulrich . | |
| 6,005,703 | * 12/1999 | Maddox | 359/206 |
| 6,038,053 | * 3/2000 | Kato | 359/205 |
| 6,061,183 | * 5/2000 | Nakai | 359/641 |
| 6,067,196 | 5/2000 | Yamamoto et al. . | |
| 6,101,020 | 8/2000 | Ori . | |
| 6,115,164 | * 9/2000 | Kamikubo | 359/196 |
| 6,115,192 | * 9/2000 | McDonald | 359/708 |
| 6,236,512 | * 5/2001 | Nakai | 359/641 |

FOREIGN PATENT DOCUMENTS

| | | |
|---|---|---|
| 58-14109 | 1/1983 | (JP) . |
| 58-38915 | 3/1983 | (JP) . |
| 61-273520 | 12/1986 | (JP) . |
| 61-279820 | 12/1986 | (JP) . |
| 2-733324 | 3/1990 | (JP) . |

* cited by examiner

Primary Examiner—Georgia Epps
Assistant Examiner—Gary O'Neill
(74) Attorney, Agent, or Firm—Arnold International; Bruce Y. Arnold

(57) ABSTRACT

A collimator lens having only two lens elements, wherein the surface of the collimator lens nearest the collimated light side is concave, and at least one of the two lens elements includes an aspherical surface having diffraction optical element zones thereon which provide dispersion of opposite sign to the dispersion provided by refraction of light by the lens element on which said zones are formed. Preferably, a specified condition is satisfied in order to facilitate manufacture of diffraction zones of the diffraction optical element (DOE) surface(s).

13 Claims, 14 Drawing Sheets

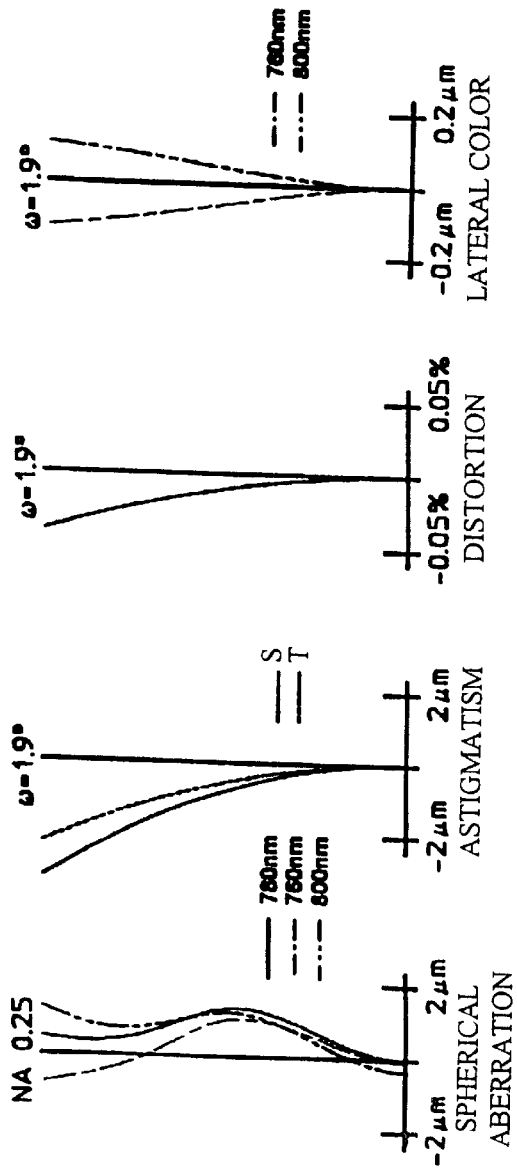

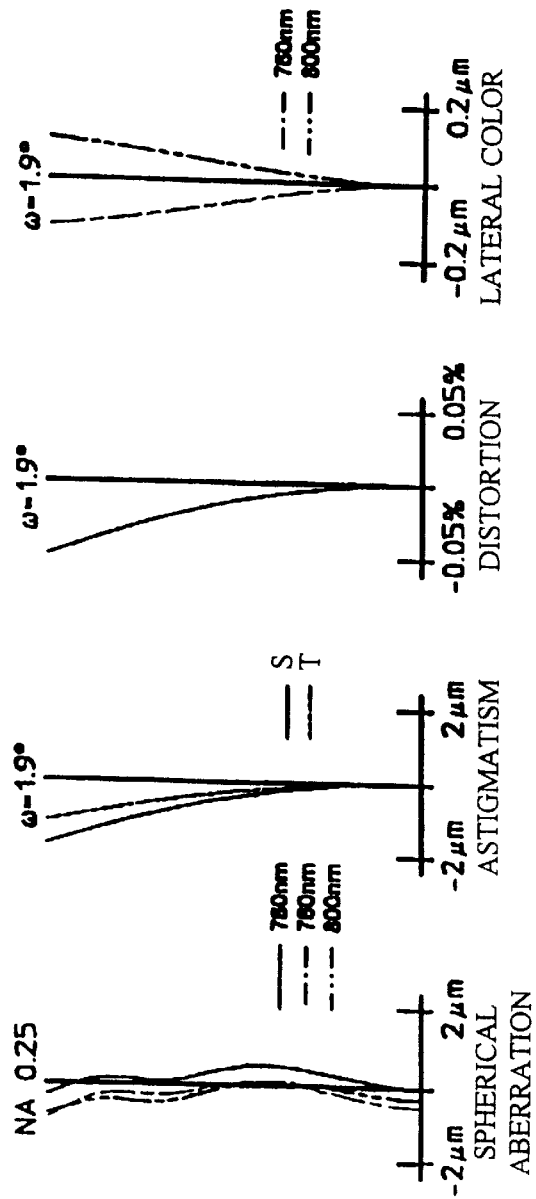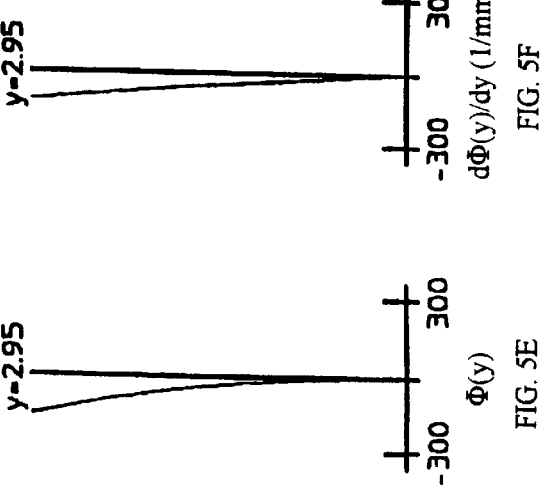

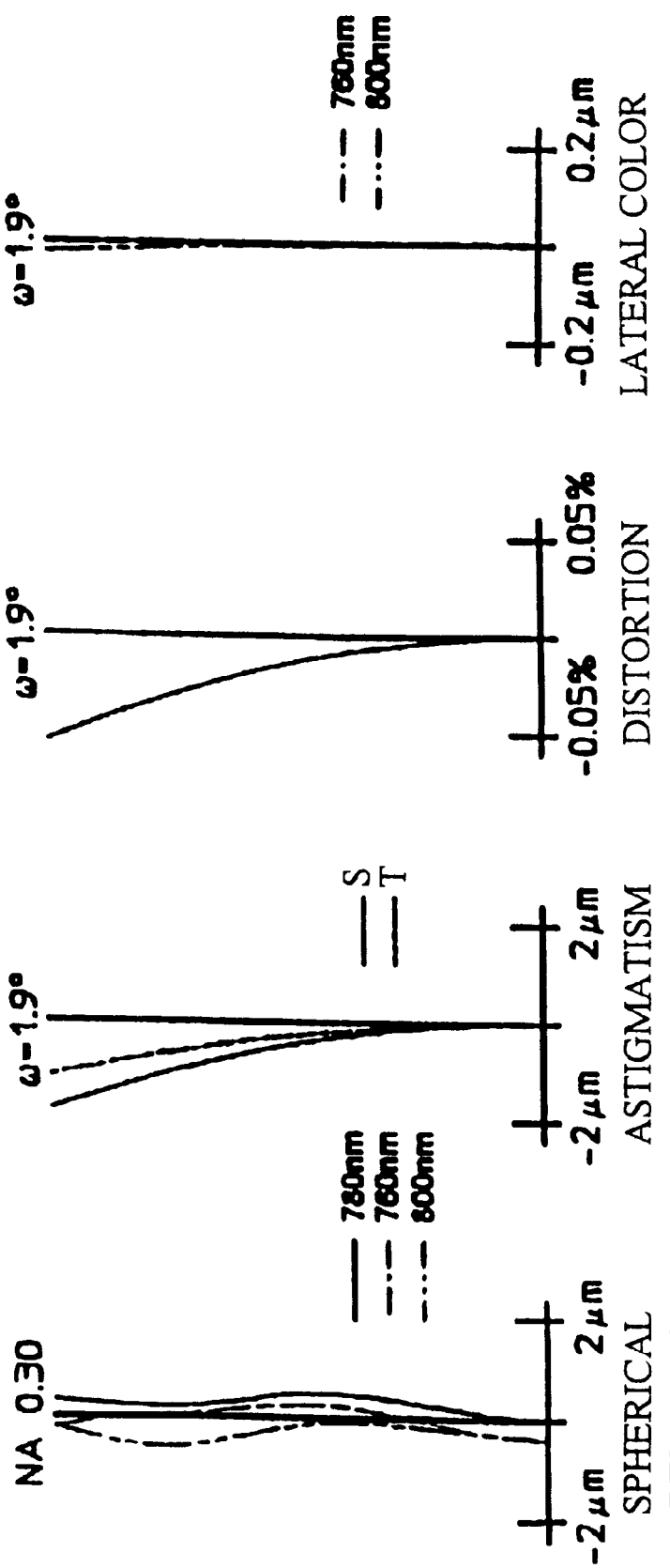

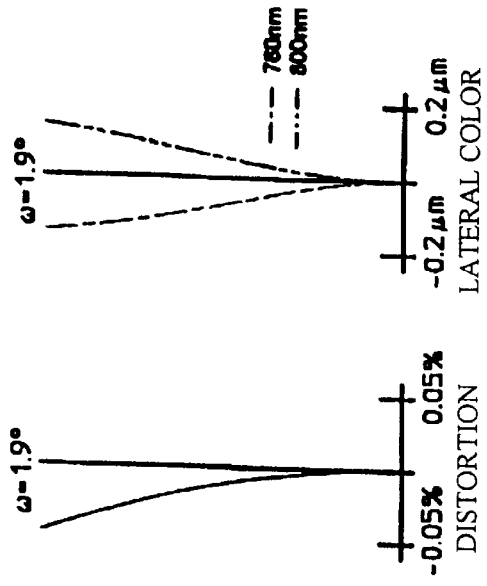
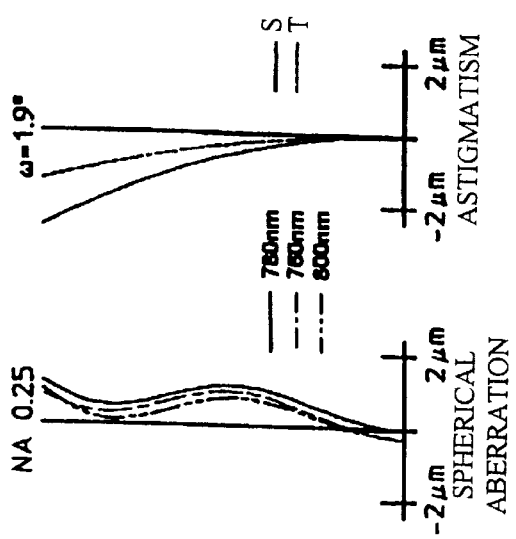
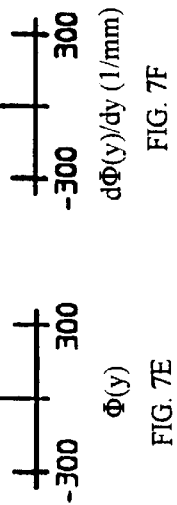

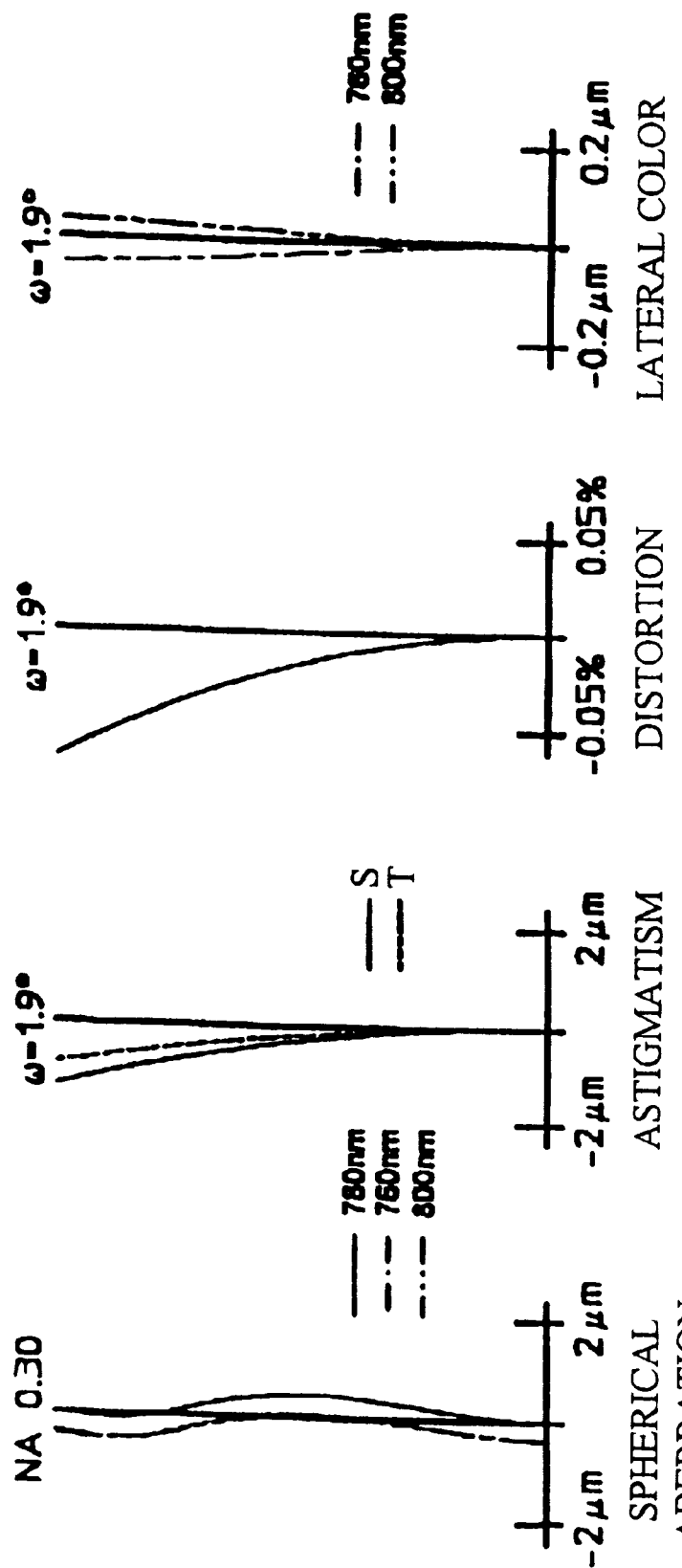

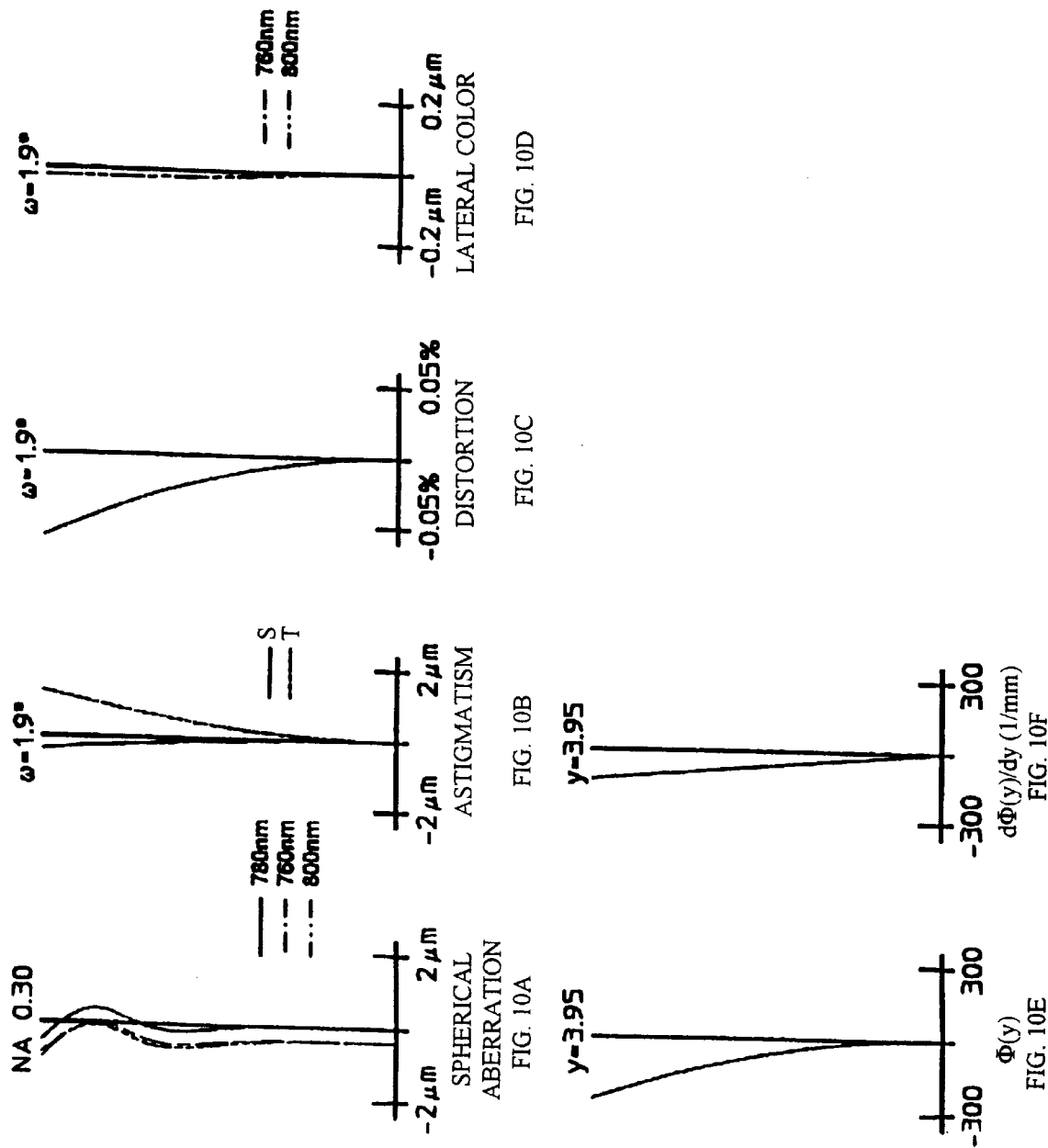

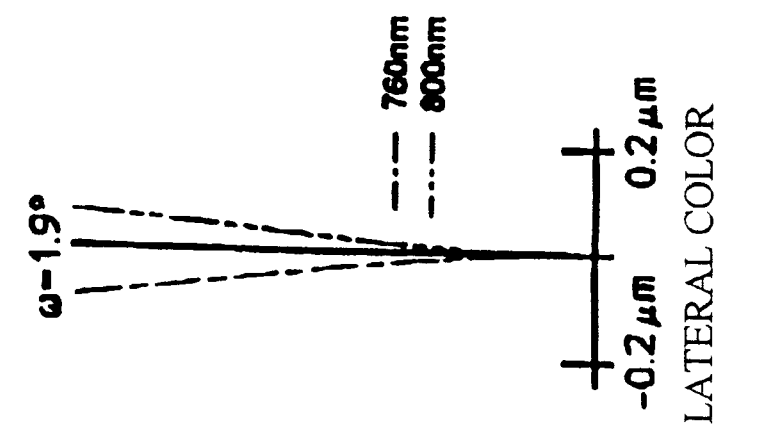
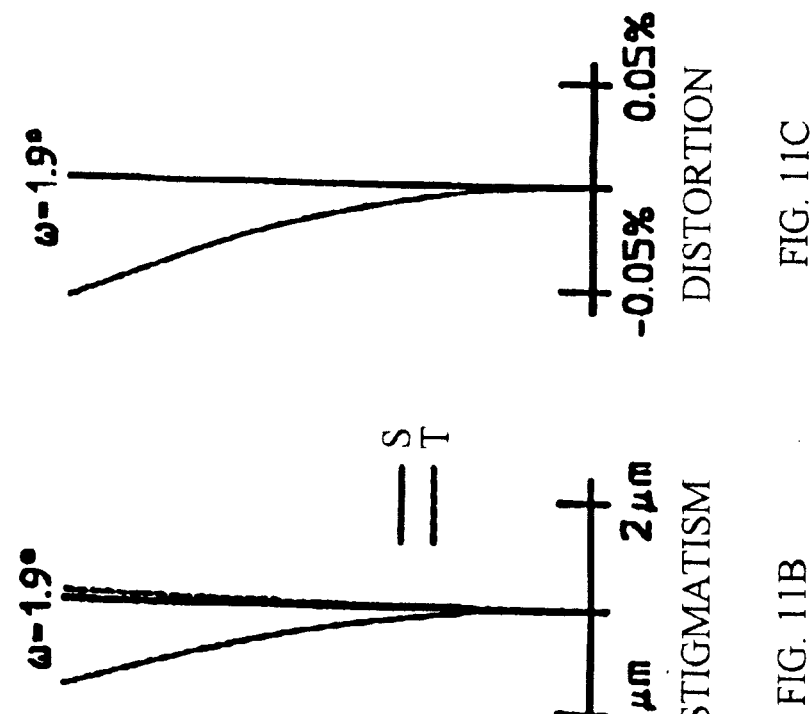
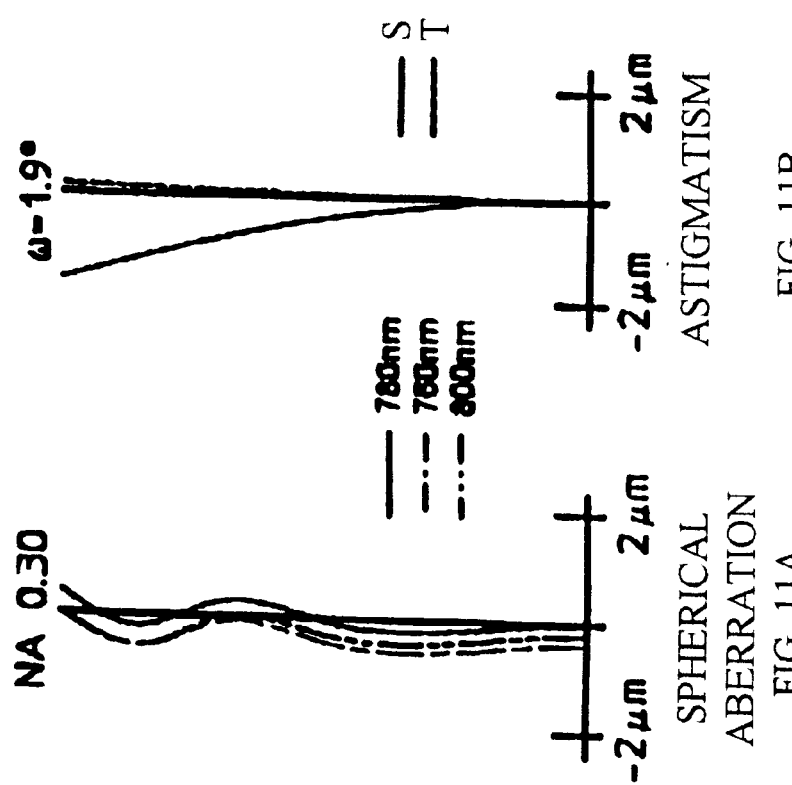
FIG. 11A SPHERICAL ABERRATION
FIG. 11B ASTIGMATISM
FIG. 11C DISTORTION
FIG. 11D LATERAL COLOR

COLLIMATOR LENS AND OPTICAL SCANNING DEVICE WHICH USES IT

BACKGROUND OF THE INVENTION

Various optical scanning devices used in laser beam scanning such as in copy machines, laser printers, and the like, or for recording or displaying picture images are conventionally known. Such optical scanning devices generally use a collimator lens to collimate the light beam received from, for example, a semiconductor laser, and are constructed so as to scan an image using a rotating multi-faceted mirror and an f·θ lens. Collimator lenses consisting of two lens elements are disclosed in Japanese Laid Open Patent Applications S58-14109, S58-38915, S61-279820, S61-273520, and H2-73324. These collimator lenses are light in weight and compact.

When using a collimator lens in conjunction with an optical scanning device, the numerical aperture of the collimator lens that is employed is generally larger than that of the f 0 lens, in order to obtain high efficiency in gathering the light from a light source. However, such a design produces greater aberrations. Therefore, the aberrations of the collimator lens generally need to be corrected carefully.

Furthermore, in an optical scanning device, a multiple beam format is used for multi-beam scanning that uses multiple light sources, making it possible to either increase the scan speed or to make simultaneous recordings in one scan. In cases where a multi-beam format is used, favorable aberration correction is desirable within a half-picture angle so of two degrees.

With the above-mentioned collimator lenses, little consideration has apparently been given to the performance of the collimator lens at large picture angles. If the picture angle is large, since the various aberrations become troublesome, it becomes difficult to successfully use these lenses in a multibeam scanning optical system in which multiple light sources are arranged on a plane surface that is normal to the optical axis. In addition, in the case where use is made of a semiconductor laser as the light source, the phenomenon of mode hopping occurs as a result of changes in the ambient temperature or changes in the drive current. When mode hopping occurs, the output wavelength of the laser shifts, and this results in the position of the focus on the image-forming surface shifting due to the system magnification being dependent on the wavelength of the light. Thus, mode hopping makes it more difficult to record information with a high degree of resolution in that the various aberrations need to be well-corrected relative to the oscillation wavelength of the laser. However, the prior art collimator lenses referred to above do not adequately correct for aberrations due to a change in oscillation wavelength of the light source.

BRIEF SUMMARY OF THE INVENTION

The present invention relates to a collimator lens used in scanning devices, such as copy machines, laser printers and the like, for scanning laser beams, and recording or displaying an image. In particular, it relates to a collimator lens, and the optical scanning device which uses it, for converting optical flux emitted by a semiconductor laser into a collimated beam. A first object of the present invention is to provide a collimator lens that can be used to scan multiple light sources wherein off-axis aberrations are favorably corrected for a half-picture angle of 2 degrees. A second object of the invention is to provide a collimator lens which favorably corrects for aberrations due to a change in oscillation wavelength of the light source.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 4A–4F show the spherical aberration, astigmatism, distortion, lateral color, the phase difference function $\Phi(y)$, and the slope of $\Phi(y)$, respectively, of the collimator lens of Embodiment 1;

FIGS. 5A–5F show the spherical aberration, astigmatism, distortion, lateral color, the phase difference function $\Phi(y)$, and the slope of $\Phi(y)$, respectively, of the collimator lens of Embodiment; 2;

FIGS. 6A–6D show the spherical aberration, astigmatism, distortion, and lateral color, respectively, of the collimator lens of Embodiment 3;

FIG. 7A–7F show the spherical aberration, astigmatism, distortion, lateral color, phase difference function $\Phi(y)$, and slope of $\Phi(y)$, respectively, of the collimator lens of Embodiment 4;

FIGS. 9A–9D show the spherical aberration, astigmatism, distortion, and lateral color, respectively, of the collimator lens of Embodiment 6;

FIGS. 10A–10F show the spherical aberration, astigmatism, distortion, lateral color, phase difference function $\Phi(y)$, and slope of $\Phi(y)$, respectively, of the collimator lens of Embodiment 7;

DETAILED DESCRIPTION

Figure 1:
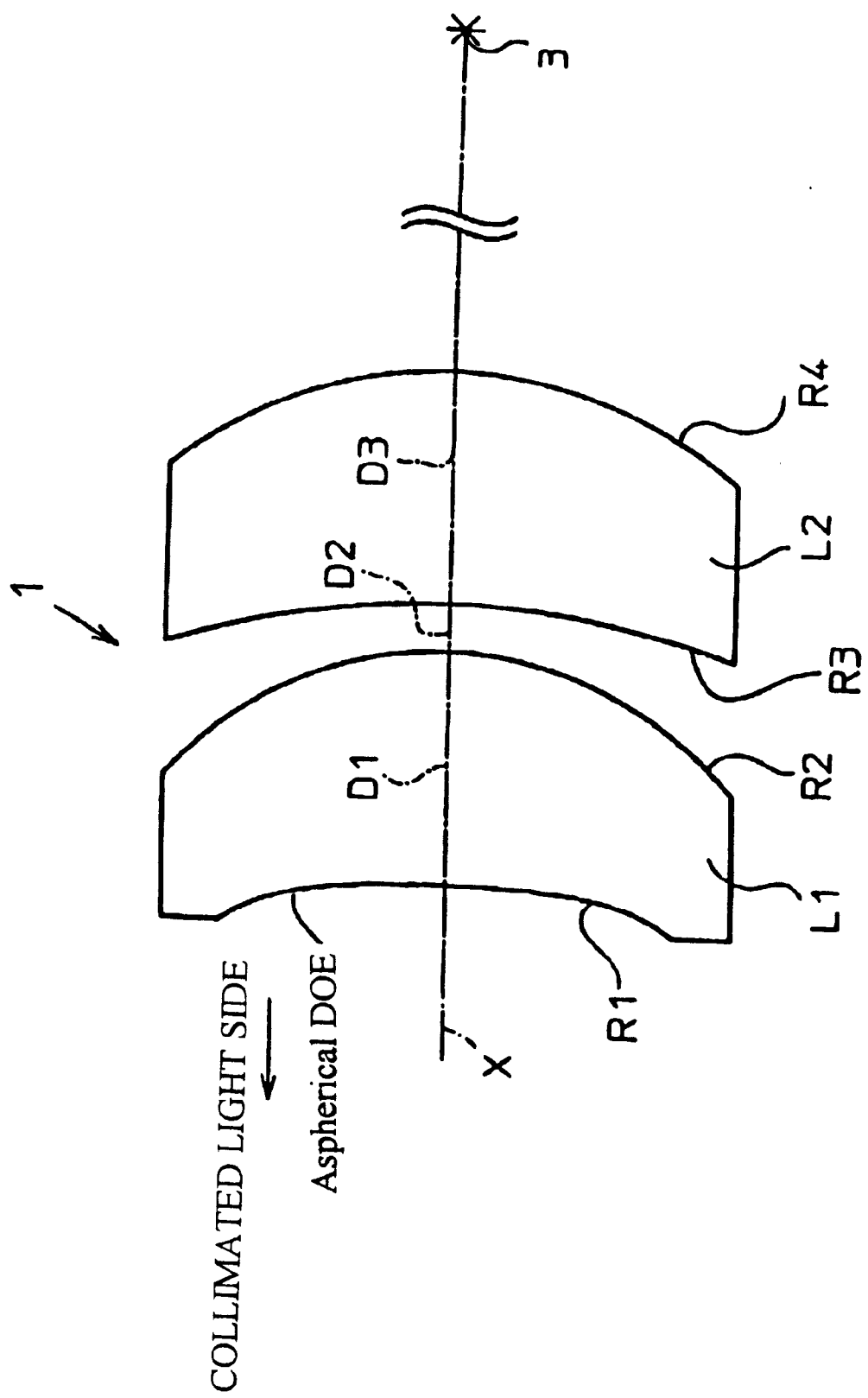
FIG. 1 shows the basic lens element structure of a collimator lens relating to Embodiment 1.

The present invention is a collimator lens that employs a simple, two-lens-element construction, wherein the two lens elements are fixed in position relative to each other and aberrations which occur with multi-beam scanning are favorably corrected for a half-picture angle ω of up to 2 degrees. Furthermore, it is an objective of the invention to provide a collimator lens and a scanning device which uses it that also provide correction relative to changes in the oscillation wavelength of the light source.

The collimator lens of the present invention is characterized by the fact that it is constructed of only two lens elements, wherein at least one surface thereof is a diffraction optical element (hereinafter DOE) that includes diffractive zones on an aspheric surface. In addition, the invention is characterized by the fact that the lens element surface at the collimated light side of the collimator lens is concave.

Furthermore, the collimator lens may be constructed in two ways, as follows, in order from the collimated light side: a first lens element having negative refractive power and a second lens element having positive refractive power, or a first lens element which has positive refractive power and a second lens element which has positive refractive power. In the case of the latter, it is desirable that the refractive power of the first lens element be established to be larger than the refractive power of the second lens element.

In addition, it is desirable that the following Condition (1) be satisfied:

$$|d\Phi(y)/dy|<300 \qquad \text{Condition (1)}$$

where, $|d\Phi(y)/dy|$ is the absolute value of the slope of the function $\Phi(y)$, with $\Phi(y)$ being the phase difference function of the DOE optical surface, and y being the distance from the optical axis.

Furthermore, the optical scanning device of the present invention is characterized by the fact that it employs the collimator lens of the present invention.

A characteristic of a DOE surface is that the dispersion thereof is larger and of an opposite sign to that of ordinary glass, as shown below.

Ordinary glass relative dispersion:

$$1/\nu=(N_1-N_3)/(N_2-1)$$

where $N_1$, $N_2$, and $N_3$ are the refractive index relative to wavelengths $\lambda_1$, $\lambda_2$, and $\lambda_3$, respectively, with $\lambda_1<\lambda_2<\lambda_3$.

DOE surface relative dispersion:

$$1/\nu=(\lambda_1-\lambda_3)/\lambda_2.$$

When mode hopping of a semiconductor laser at a standard wavelength of 780 nm is considered, with a wavelength change of ±20 nm, the reciprocal relative dispersion ν (i.e., the Abbe number) equals 611 for ordinary glass (BK-7) and equals −19.5 for the DOE surface, thus the relative dispersion 1/ν of the DOE is much larger and of the opposite sign as compared to that of glass. Therefore, by using a DOE surface, a lens having only a few lens elements can provide a reduced movement of the focal position due to mode hopping.

The DOE phase difference function is given by:

$$\Phi(y)=b_1y^2+b_2y^4+b_3y^6 \qquad \text{Equation (1)}$$

where $\Phi(y)$ is the phase difference function of the DOE surface,
y is the distance from the optical axis, and
$b_1$, $b_2$, and $b_3$ are coefficients.

The aspherical DOE surface profile is given by:

$$Z=(\Phi(y)\pm 2n\pi)\cdot(\lambda/(2T(N-1)))+(y^2/r)/(1+(1-ky^2/r^2)^{1/2})+a_4y^4+a_6y^6+a_8y^8+a_{10}y^{10} \qquad \text{Equation (2)}$$

where

Z is the distance of the DOE surface from a plane tangent to the DOE surface vertex at a distance y from the optical axis,
n is the DOE ring number (n=0, 1, 2 . . . ),
N is the refractive index at the standard wavelength,
k is an eccentricity factor, and
$a_4$, $a_6$, $a_8$, and $a_{10}$ are aspherical surface coefficients of the surface profile.

The number of zones of the DOE surface, and the pitch of each zone is determined by the phase difference function, and relative to the height y from the optical axis, to the extent that changes of the phase difference function become larger, then the pitch of each zone becomes smaller, and the unevenness of the DOE surface becomes greater.

If the pitch of each zone is small, and the unevenness is great, then processing becomes difficult. Hence, if the correct unevenness of the surface profile is not formed, the performance will completely break down. Therefore, it is desirable that Condition (1) above be satisfied.

In the case where the collimator is formed of two convex lens elements, there is a tendency for the first lens element to have strong refractive power. In such a case, as well as the case where the collimator lens is formed of the combination of a concave lens element and a convex lens element, the height of the optical rays which are incident onto the lens surface which has the stronger refractive power can be increased, by which means (since the Petzval sum can be made smaller), the curvature of the image surface can be corrected. On the other hand, when construction is accomplished with two convex lens elements, spherical aberration can be corrected by making the first lens element have a strong refractive power.

Figure 2:
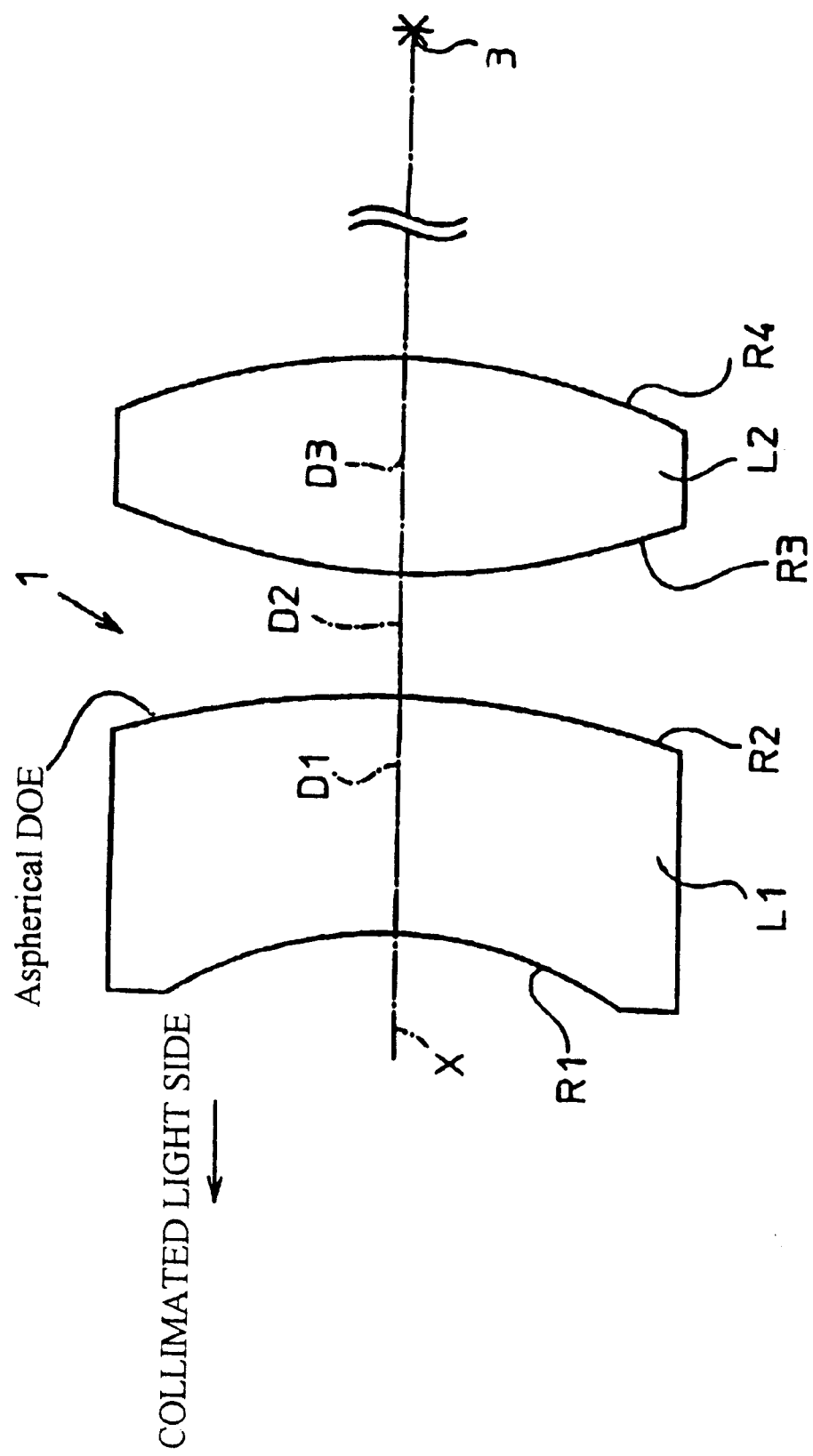
FIG. 2 shows the basic lens element structure of a collimator lens relating to Embodiment 2.
Figure 3:
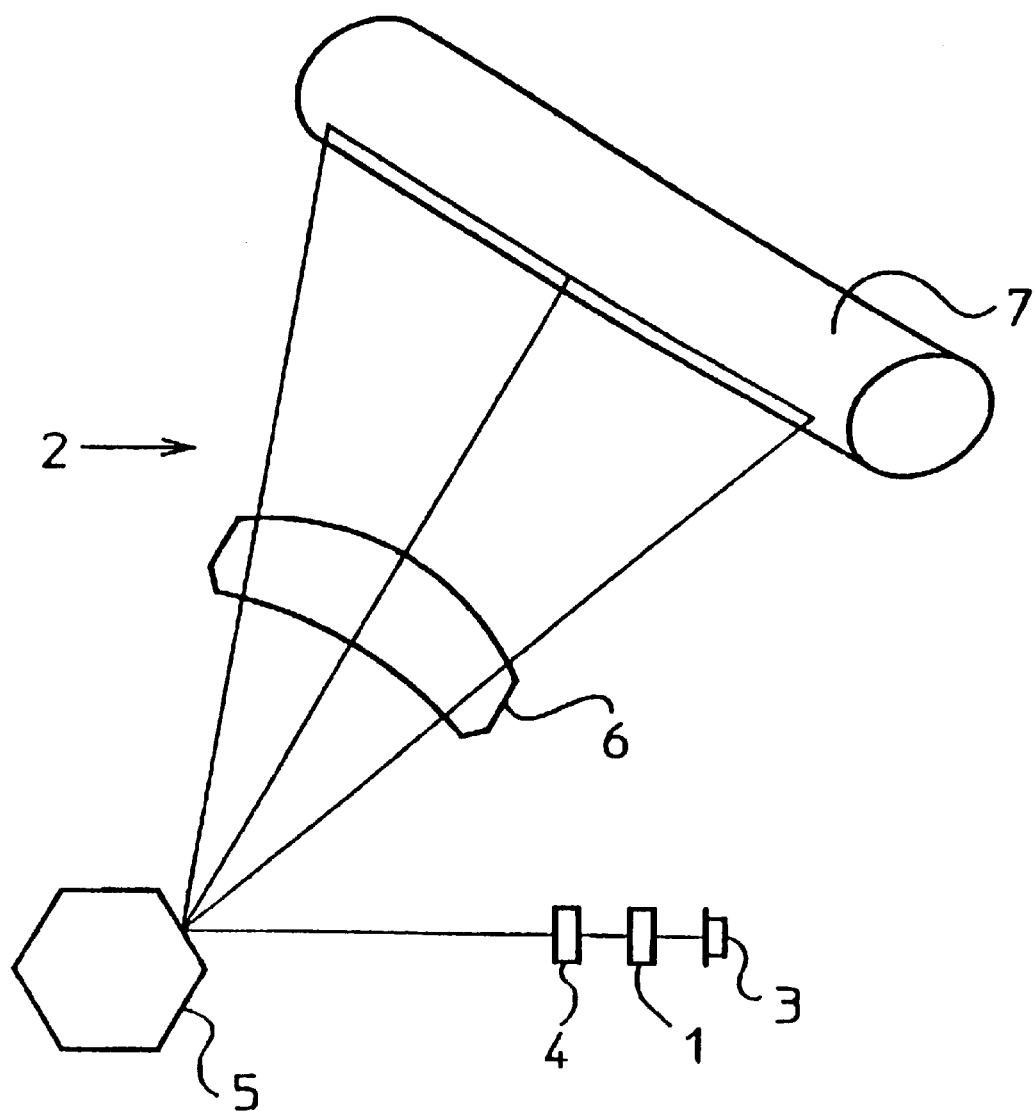
FIG. 3 illustrates an optical scanning device which uses the collimator lens shown in FIG. 1.

A generalized description of the collimator lens of the invention will now be given with reference to the drawings. FIG. 1 shows the basic lens element construction of the collimator lens of Embodiments 1 and 4 of the present invention. FIG. 2 shows the basic lens element construction of the collimator lens of Embodiments 2, 3 and 5–8. FIG. 3 shows the basic components of an optical scanning device which uses the collimator lens of Embodiments 1–8.

The optical scanning device 2, as shown in FIG. 3, converts a laser beam emitted from the semiconductor laser 3 into collimated light by means of the collimator lens 1. A compensation optical system 4, formed using a slit, cylindrical lens, or the like, corrects deficiencies of the polygon mirror 5. The laser beam is deflected by means of the rotating polygon mirror 5, and a minute spot of light is guided to the surface of the light-conducting, photosensitive drum 7 by means of f·θ lens 6. Thus, the drum 7 is scanned by the scanning beam as the drum is rotated.

As shown in FIGS. 1 and 2, the collimator lens 1 of the present invention is formed by arranging, in order from the collimated light side of the collimator lens: a first lens element $L_1$ which has positive or negative refractive power, and has a concave surface on the collimated light side, and a second lens element $L_2$ which has positive refractive power and a convex surface on the side of the semiconductor laser 3. In addition, at least one lens element surface is a DOE surface.

In FIGS. 1 and 2, the optical axis is labeled X.

Furthermore, the shape of the aspherical, DOE surface(s) is (are) given by Equations (1) and (2) above, and the collimator lens satisfies the above Condition (1).

By satisfying Condition (1), the pitch of each diffraction zone of the DOE surface(s) can be made larger and, since the height of the unevenness of the optical surface does not become larger to the same extent, the process of manufacturing the DOE surface(s) becomes easier. Thus, the formation of the desired surface profile with high precision is easier to accomplish.

With a collimator lens 1 constructed in the manner described above, although the collimator lens consists of only two lens elements, the numerical aperture can be as large as approximately 0.25–0.3 while providing a collimator lens having its off-axis aberrations favorably corrected, as is desirable in an optical scanning device which employs multiple scanning beams.

The collimator lens 1 of the present invention also enables the optical flux on the optical source side to be nearly telecentric. Thus, even if the light source is not positioned accurately on the optical axis, the lens performance will not deteriorate.

Using this characteristic, the collimator lens 1 of the present invention can be used in a multi-beam scanning optical system wherein multiple semiconductor lasers are arranged in a line that is normal to the optical axis. For example, in a color copier device, three semiconductor lasers can be arranged corresponding to the colors red, green, and blue, respectively. Also, dual monochrome and color use can be provided by arranging four semiconductor lasers in a line that is normal to the optical axis. In addition, by arranging multiple semiconductor lasers for monochrome use in the direction of duplicate scanning, the number of scans can be reduced, thereby compressing the optical scanning time.

The collimator lens 1 of the present invention can be used to form an image of an object onto a recording medium, as well as to collect the light of a laser beam at an image surface. Thus the collimator lens of the present invention can be used as a lens for scanning or as a lens for an optical pickup, such as with an optical disk. In the case where the collimator lens 1 of the present invention is used in the manner indicated above, the focal distance of the entire lens system is desirably within the range of 3–30 mm.

A detailed description of Embodiments 1–8 will now be given, using specific numerical values.

EMBODIMENT 1

As shown in FIG. 1, the collimator lens 1 relating to Embodiment 1 is constructed, in order from the collimated light side, of a first lens element $L_1$ having a positive meniscus shape with its concave surface on the collimated light side, and a second lens element $L_2$ having a positive meniscus shape. Further, the collimated light side of the first lens element $L_1$ is made to be a DOE surface having an aspherical substrate.

Table 1 below lists the surface number #, in order from the collimated light side of the collimator lens, the radius of curvature R (in mm) of each lens element surface, the spacing D (in mm) between the surfaces, as well as the refractive index N at the wavelengths 760 nm, 780 nm and 800 nm. The surface with a * to the right of the surface number is an aspheric, DOE surface. In the middle portion of the table, are listed the numerical aperture NA, the focal length f' of the collimator lens, the focal length $f_1$ of the first lens element in order from the collimated light side, the focal length $f_2$ of the second lens element in order from the collimated light side, and the radius of curvature $r_1$ of a spherical surface having the same vertex point and two endpoints of an effective diameter as that of the concave, aspherical surface nearest the collimated light side. In the lower portion of the table are listed the values of k, $a_4$, $a_6$, $a_8$, and $a_{10}$, as well as the values of the coefficients $b_1$, $b_2$, and $b_3$ for Equations (1) and (2) above relating to surface #1.

TABLE 1

| # | R | D | N<760 nm> | N<780 nm> | N<800 nm> |
|---|---|---|---|---|---|
| 1* | −34.147 | 4.167 | 1.58302 | 1.58252 | 1.58205 |
| 2 | −6.485 | 0.854 | | | |
| 3 | −15.156 | 4.070 | 1.49314 | 1.49283 | 1.49253 |
| 4 | −7.811 | | | | |

| NA = 0.25 | f' = 10 | $f_1$ = 12.66 | $f_2$ = 27.65 | $r_1$ = −20.18 |
|---|---|---|---|---|

Aspherical and DOE coefficients of surface #1:

| k = | 9.4285 | $b_1$ = | −1.1587 × 10 |
|---|---|---|---|
| $a_4$ = | −1.4311 × 10$^{-3}$ | $b_2$ = | −1.7891 × 10$^{-2}$ |
| $a_6$ = | −2.1656 × 10$^{-5}$ | $b_3$ = | −8.1526 × 10$^{-6}$ |
| $a_8$ = | −9.5676 × 10$^{-7}$ | | |
| $a_{10}$ = | 6.8918 × 10$^{-9}$ | | |

FIGS. 4A–4F show the spherical aberration, astigmatism, distortion, lateral color, the 15 phase difference function Φ(y), and the slope of Φ(y), respectively, of the collimator lens of Embodiment 1.

EMBODIMENT 2

The collimator lens 1 of Embodiment 2 is formed, in order from the collimated light side, of a first lens element $L_1$ having a negative meniscus shape with its convex surface on the collimated light side, and a second lens element $L_2$ having a biconvex shape, wherein the surface on the light source side of the first lens element $L_1$ is a DOE surface.

Table 2 below lists the surface number #, in order from the collimated light of the collimator lens, the radius of curvature R (in mm) of each lens element surface, the spacing D (in mm) between the surfaces, as well as the refractive index N at the wavelengths 760 nm, 780 nm and 800 nm. The surface with a * to the right of the surface number is an aspheric, DOE surface. In the middle portion of the table, are listed the numerical aperture NA, the focal length f' of the collimator lens, the focal length $f_1$ of the first lens element in order from the collimated light side, and the focal length $f_2$ of the second lens element in order from the collimated light side. In the lower portion of the table are listed the values of k, $a_4$, $a_6$, $a_8$, and $a_{10}$, as well as the values of the coefficients $b_1$, $b_2$, and $b_3$ for Equations (1) and (2) above relating to surface #2.

TABLE 2

| # | R | D | N<760 nm> | N<780 nm> | N<800 nm> |
|---|---|---|---|---|---|
| 1 | −7.023 | 2.564 | 1.58302 | 1.58252 | 1.58205 |
| 2* | −17.769 | 0.500 | | | |
| 3 | 25.148 | 4.167 | 1.77771 | 1.77690 | 1.77613 |
| 4 | −8.546 | | | | |

| NA = 0.25 | f' = 10 | $f_1$ = −24.19 | $f_2$ = 8.68 |
|---|---|---|---|

Aspherical and DOE coefficients of surface #2:

| k = | 1.8485 | $b_1$ = | −1.5721 × 10 |
|---|---|---|---|
| $a_4$ = | 8.9347 × 10$^{-4}$ | $b_2$ = | −2.1988 × 10$^{-1}$ |
| $a_6$ = | 1.4092 × 10$^{-5}$ | $b_3$ = | −7.2516 × 10$^{-4}$ |
| $a_8$ = | 4.4457 × 10$^{-7}$ | | |
| $a_{10}$ = | −1.2172 × 10$^{-8}$ | | |

FIGS. 5A–5F show the spherical aberration, astigmatism, distortion, lateral color, the phase difference function Φ(y), and the slope of $\Phi(y)$, respectively, of the collimator lens of Embodiment 2.

EMBODIMENT 3

The collimator lens 1 of Embodiment 3 has approximately the same construction as Embodiment 2, however, both surfaces of the first lens $L_1$ are aspherical, DOE surfaces having phase difference functions and profiles as defined by Equations (1) and (2) above.

Table 3 below lists the surface number #, in order from the collimated light side of the collimator lens, the radius of curvature R (in mm) of each lens element surface, the spacing D (in mm) between the surfaces, as well as the refractive index N at the wavelengths 760 nm, 780 nm and 800 nm. The surfaces with a * to the right of the surface number are aspheric, DOE surfaces. In the middle portion of the table, are listed the numerical aperture NA, the focal length f' of the collimator lens, the focal length $f_1$ of the first lens element in order from the collimated light side, the focal length $f_2$ of the second lens element in order from the collimated light side, and the radius of curvature $r_1$ of a spherical surface having the same vertex point and two endpoints of an effective diameter as that of the concave, aspherical surface nearest the collimated light side. In the lower portion of the table are listed the values of k, $a_4$, $a_6$, $a_8$, and $a_{10}$, as well as the values of the coefficients $b_1$, $b_2$, and $b_3$ for Equations (I) and (2) above relating to surfaces #1 and 2.

TABLE 3

| # | R | D | N<760 nm> | N<780 nm> | N<800 nm> |
|---|---|---|---|---|---|
| 1* | −6.702 | 4.055 | 1.58302 | 1.58252 | 1.58205 |
| 2* | −10.378 | 0.366 | | | |
| 3 | 25.913 | 3.000 | 1.76279 | 1.76202 | 1.76129 |
| 4 | −11.691 | | | | |

NA = 0.30   f' = 10   $f_1$ = −69.10   $f_2$ = 10.95   $r_1$ = −6.33

| Aspherical and DOE coefficients of Surface #1: | | Aspherical and DOE coefficients of Surface #2: | |
|---|---|---|---|
| k = | 1.2020 | k = | $6.7062 \times 10^{-1}$ |
| $a_4$ = | $-5.8734 \times 10^{-4}$ | $a_4$ = | $6.3675 \times 10^{-5}$ |
| $a_6$ = | $1.2009 \times 10^{-5}$ | $a_6$ = | $8.2780 \times 10^{-6}$ |
| $a_8$ = | $-1.5243 \times 10^{-7}$ | $a_8$ = | $2.7643 \times 10^{-8}$ |
| $a_{10}$ = | $2.8266 \times 10^{-8}$ | $a_{10}$ = | $2.8441 \times 10^{-9}$ |
| $b_1$ = | $2.1220 \times 10$ | $b_1$ = | $-2.7117 \times 10$ |
| $b_2$ = | $1.2193 \times 10^{-1}$ | $b_2$ = | $-6.1722 \times 10^{-2}$ |
| $b_3$ = | $-5.3965 \times 10^{-5}$ | $b_3$ = | $-7.3727 \times 10^{-4}$ |

Figures 6E, 6F:
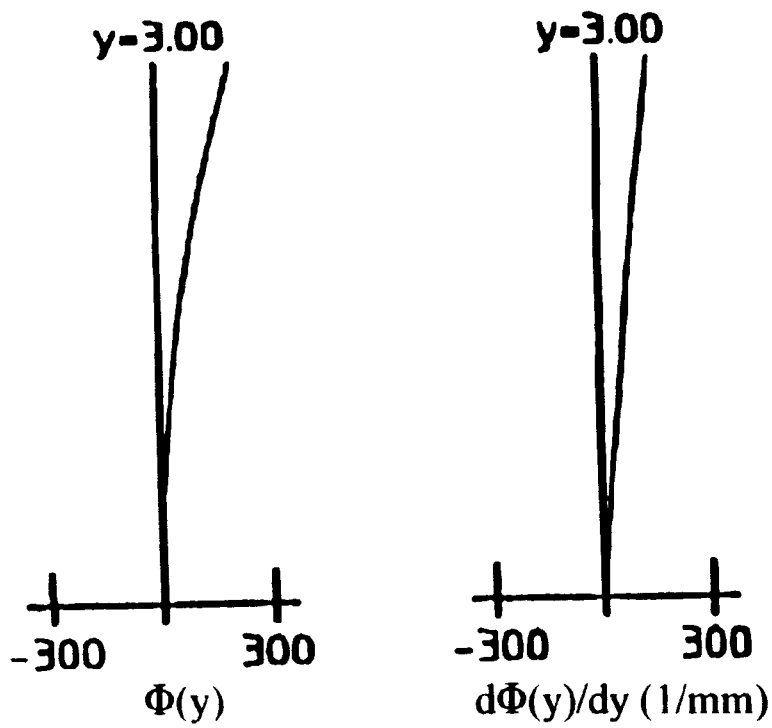
FIGS. 6E & 6F show the phase difference function $\Phi(y)$, and the slope of $\Phi(y)$ of surface #1 of the collimator lens of Embodiment 3.
Figures 6G, 6H:
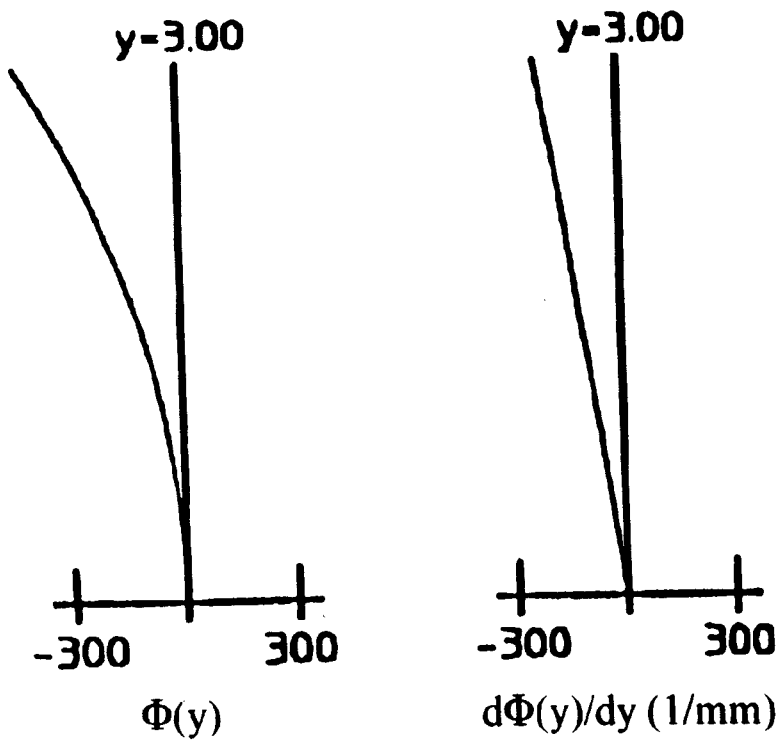
FIGS. 6G & 6H show the phase difference function $\Phi(y)$, and the slope of $\Phi(y)$ of surface #2 of the collimator lens of Embodiment 3.
Figures 8A, 8B, 8C, 8D:
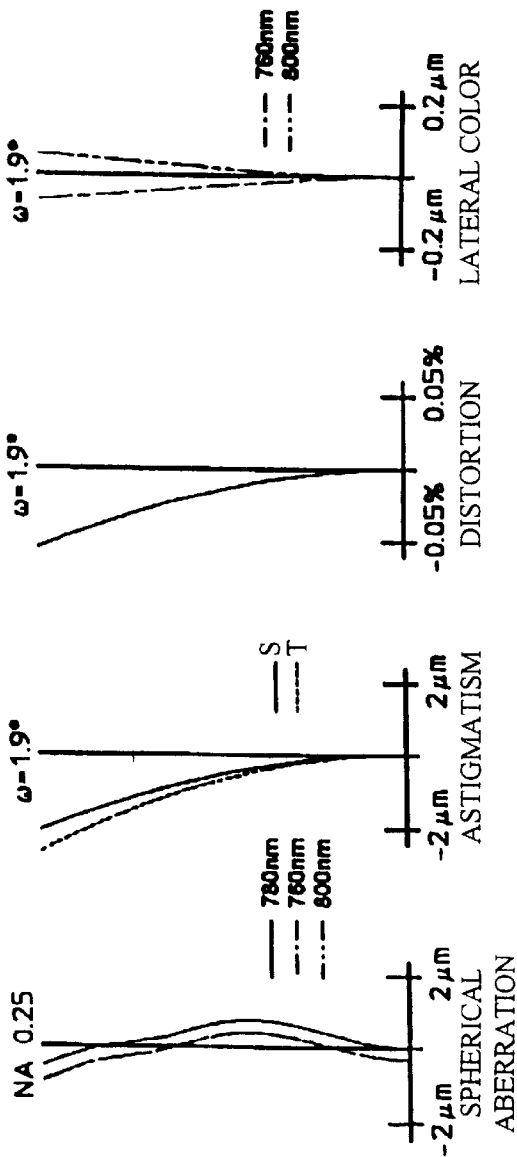
FIGS. 8A–8F show the spherical aberration, astigmatism, distortion, lateral color, phase difference function $\Phi(y)$, and slope of $\Phi(y)$, respectively, of the collimator lens of Embodiment 5.
Figures 8E, 8F:
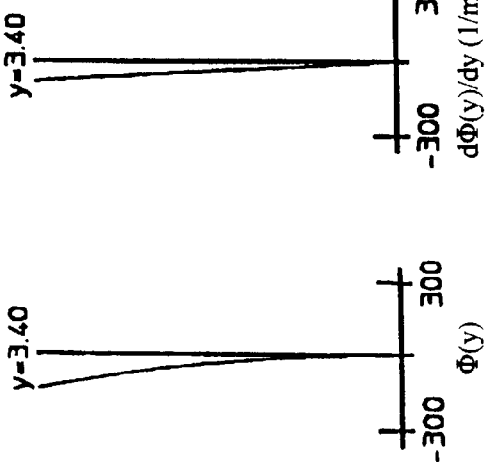

FIGS. 6A–6D show the spherical aberration, astigmatism, distortion, and lateral color, respectively, of the collimator lens of Embodiment 3. FIGS. 6E & 6F show the phase difference function $\Phi(y)$ and the slope of $\Phi(y)$, respectively, of surface #1 of this embodiment, and FIGS. 6G & 6H show the phase difference function $\Phi(y)$ and the slope of $\Phi(y)$, respectively, of surface #2 of this embodiment.

EMBODIMENT 4

The collimator lens 1 of Embodiment 4 has the same basic lens element configuration as that of Embodiment 1.

Table 4 below lists the surface number #, in order from the collimated light side of the collimator lens, the radius of curvature R (in mm) of each lens element surface, the spacing D (in mm) between the surfaces, as well as the refractive index N at the wavelengths 760 nm, 780 nm and 800 nm. The surface with a * to the right of the surface number is an aspheric, DOE surface. In the middle portion of the table, are listed the numerical aperture NA, the focal length f' of the collimator lens, the focal length $f_1$ of the first lens element in order from the collimated light side, the focal length $f_2$ of the second lens element in order from the collimated light side, and the radius of curvature $r_1$ of a spherical surface having the same vertex point and two endpoints of an effective diameter as that of the concave, aspherical surface nearest the collimated light side. In the lower portion of the table are listed the values of k, $a_4$, $a_6$, $a_8$, and $a_{10}$ as well as the values of the coefficients $b_1$, $b_2$, and $b_3$ for Equations (1) and (2) above relating to surface #1.

TABLE 4

| # | R | D | N<760 nm> | N<780 nm> | N<800 nm> |
|---|---|---|---|---|---|
| 1* | −39.615 | 5.000 | 1.58302 | 1.58252 | 1.58205 |
| 2 | −7.735 | 0.904 | | | |
| 3 | −14.420 | 2.063 | 1.79175 | 1.79092 | 1.79013 |
| 4 | −8.697 | | | | |

NA = 0.25   f' = 10   $f_1$ = 15.00   $f_2$ = 23.90   $r_1$ = −22.15

Aspherical and DOE Coefficients of Surface #1:

| | | | |
|---|---|---|---|
| k = | 1.0004 | $b_1$ = | $-1.3561 \times 10$ |
| $a_4$ = | $-1.3443 \times 10^{-3}$ | $b_2$ = | $-2.6709 \times 10^{-1}$ |
| $a_6$ = | $-1.7907 \times 10^{-5}$ | $b_3$ = | $-2.7744 \times 10^{-5}$ |
| $a_8$ = | $-6.7866 \times 10^{-7}$ | | |
| $a_{10}$ = | $-2.7310 \times 10^{-9}$ | | |

FIG. 7A–7F show the spherical aberration, astigmatism, distortion, lateral color, phase difference function $\Phi(y)$, and slope of $\Phi(y)$, respectively, of the collimator lens of Embodiment 4.

EMBODIMENT 5

The collimator lens 1 of Embodiment 5 has the same basic lens element configuration as that of Embodiment 2, except that, in this embodiment, the surface on the collimated light side of the second lens element $L_2$ is an aspherical, DOE surface.

Table 5 below lists the surface number #, in order from the collimated light side of the collimator lens, the radius of curvature R (in mm) of each lens element surface, the spacing D (in mm) between the surfaces, as well as the refractive index N at the wavelengths 760 nm, 780 nm and 800 nm. The surface with a * to the right of the surface number is an aspheric, DOE surface. In the middle portion of the table, are listed the numerical aperture NA, the focal length f' of the collimator lens, the focal length $f_1$ of the first lens element in order from the collimated light side, and the focal length $f_2$ of the second lens element in order from the collimated light side. In the lower portion of the table are listed the values of k, $a_4$, $a_6$, $a_8$, and $a_{10}$, as well as the values of the coefficients $b_1$, $b_2$, and $b_3$ for Equations (1) and (2) above relating to surfaces #3.

TABLE 5

| # | R | D | N<760 nm> | N<780 nm> | N<800 nm> |
|---|---|---|---|---|---|
| 1 | −4.546 | 2.636 | 1.79175 | 1.79092 | 1.79013 |
| 2 | −6.201 | 0.732 | | | |
| 3* | 12.293 | 2.500 | 1.58302 | 1.58252 | 1.58205 |
| 4 | −13.666 | | | | |

NA = 0.25   f' = 10   $f_1$ = −72.61   $f_2$ = 11.17

TABLE 5-continued

Aspherical and DOE coefficients of surface #3:

| | | | |
|---|---|---|---|
| k = | $9.8034 \times 10^{-1}$ | $b_1 =$ | $-1.1640 \times 10$ |
| $a_4 =$ | $-2.6109 \times 10^{-4}$ | $b_2 =$ | $-2.8818 \times 10^{-2}$ |
| $a_6 =$ | $-8.1066 \times 10^{-7}$ | $b_3 =$ | $4.5261 \times 10^{-7}$ |
| $a_8 =$ | $-4.6880 \times 10^{-8}$ | | |
| $a_{10} =$ | $2.0499 \times 10^{-9}$ | | |

FIGS. 8A–8F show the spherical aberration, astigmatism, distortion, lateral color, phase difference function $\Phi(y)$, and slope of $\Phi(y)$, respectively, of the collimator lens of Embodiment 5.

EMBODIMENT 6

The collimator lens 1 of Embodiment 6 is constructed approximately the same as Embodiment 5, however, in Embodiment 6, both surfaces of the second lens element $L_2$ are aspherical DOE surfaces.

Table 6 below lists the surface number #, in order from the collimated light side of the collimator lens, the radius of curvature R (in mm) of each lens element surface, the spacing D (in mm) between the surfaces, as well as the refractive index N at the wavelengths 760 nm, 780 nm and 800 nm. The surfaces with a * to the right of the surface number are aspheric, DOE surfaces. In the middle portion of the table, are listed the numerical aperture NA, the focal length f' of the collimator lens, the focal length $f_1$ of the first lens element in order from the collimated light side, and the focal length $f_2$ of the second lens element in order from the collimated light side. In the lower portion of the table are listed the values of k, $a_4$, $a_6$, $a_8$, and $a_{10}$, as well as the values of the coefficients $b_1$, $b_2$, and $b_3$ for Equations (1) and (2) above relating to surfaces #3 and #4.

TABLE 6

| # | R | D | N<760 nm> | N<780 nm> | N<800 nm> |
|---|---|---|---|---|---|
| 1 | −5.487 | 4.533 | 1.79175 | 1.79092 | 1.79013 |
| 2 | −7.805 | 1.833 | | | |
| 3* | 10.015 | 3.667 | 1.58302 | 1.58252 | 1.58205 |
| 4* | −31.162 | | | | |

NA = 0.30   f' = 10   $f_1$ = −171.30   $f_2$ = 12.97

| Aspherical and DOE coefficients of surface #3: | | Aspherical and DOE coefficients of Surface #4: | |
|---|---|---|---|
| k = | 1.0236 | k = | 1.0021 |
| $a_4 =$ | $-7.2045 \times 10^{-5}$ | $a_4 =$ | $1.5307 \times 10^{-4}$ |
| $a_6 =$ | $3.2211 \times 10^{-8}$ | $a_6 =$ | $1.5735 \times 10^{-7}$ |
| $a_8 =$ | $8.2613 \times 10^{-9}$ | $a_8 =$ | $7.3761 \times 10^{-9}$ |
| $a_{10} =$ | $-4.2583 \times 10^{-10}$ | $a_{10} =$ | $-6.2605 \times 10^{-10}$ |
| $b_1 =$ | $-6.7453 \times 10$ | $b_1 =$ | $-5.4124 \times 10$ |
| $b_2 =$ | $-5.7822 \times 10^{-3}$ | $b_2 =$ | $-4.3078 \times 10^{-3}$ |
| $b_3 =$ | $-1.4254 \times 10^{-5}$ | $b_3 =$ | $-8.7963 \times 10^{-6}$ |

Figures 9E, 9F:
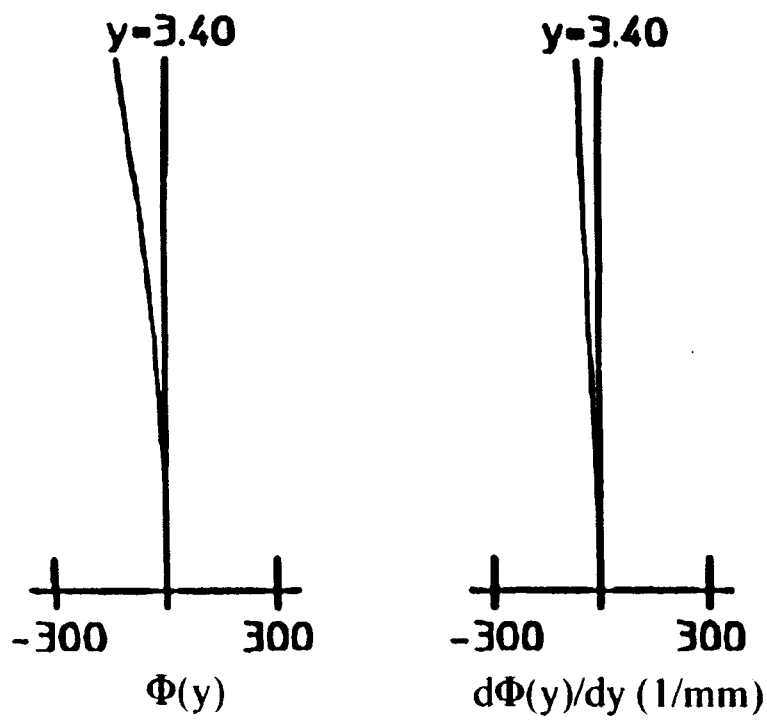
FIGS. 9E & 9F show the phase difference function $\Phi(y)$, and the slope of $\Phi(y)$ of surface #3 of the collimator lens of Embodiment 6.
Figures 9G, 9H:
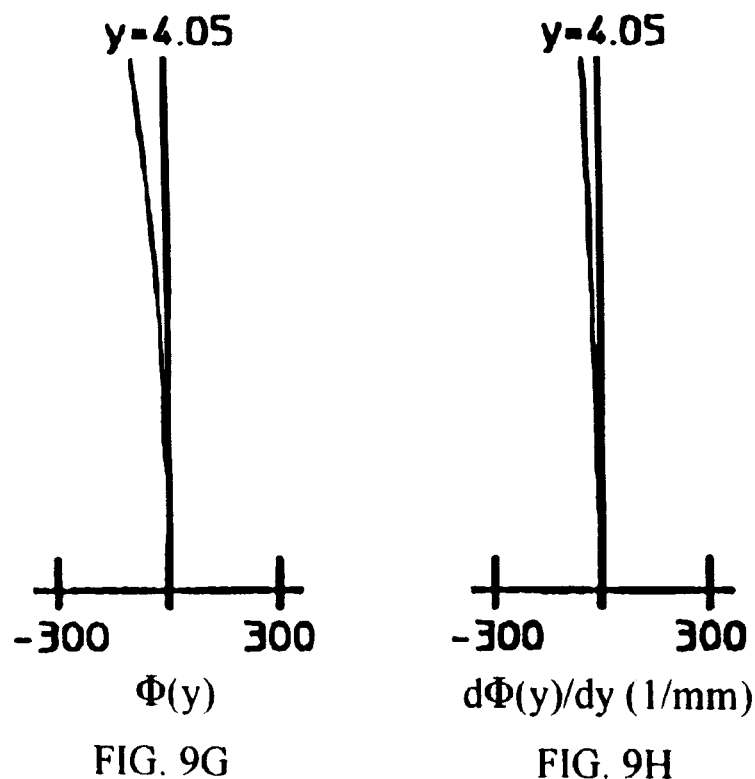
FIGS. 9G & 9H show the phase difference function $\Phi(y)$, and the slope of $\Phi(y)$ of surface #4 of the collimator lens of Embodiment 6.

FIGS. 9A–9D show the spherical aberration, astigmatism, distortion, and lateral color, respectively, of the collimator lens of Embodiment 6. FIGS. 9E & 9F show the phase difference function $\Phi(y)$ and the slope of $\Phi(y)$, respectively, of surface #3 of this embodiment, and FIGS. 9G & 9H show the phase difference function $\Phi(y)$ and the slope of $\Phi(y)$, respectively, of surface #4 of this embodiment.

EMBODIMENT 7

The collimator lens 1 relating to Embodiment 7 is constructed approximately the same as Embodiment 5, however, the surface of the light source side of the second lens element $L_2$ is an aspherical DOE surface.

Table 7 below lists the surface number #, in order from the collimated light side of the collimator lens, the radius of curvature R (in mm) of each lens element surface, the spacing D (in mm) between the surfaces, as well as the refractive index N at the wavelengths 760 nm, 780 nm and 800 nm. The surface with a * to the right of the surface number is an aspheric, DOE surface. In the middle portion of the table, are listed the numerical aperture NA, the focal length f' of the collimator lens, the focal length $f_1$ of the first lens element in order from the collimated light side, and the focal length $f_2$ of the second lens element in order from the collimated light side. In the lower portion of the table are listed the values of k, $a_4$, $a_6$, $a_8$, and $a_{10}$, as well as the values of the coefficients $b_1$, $b_2$, and $b_3$ for Equations (1) and (2) above relating to surface #3 and surface #4.

TABLE 7

| # | R | D | N<760 nm> | N<780 nm> | N<800 nm> |
|---|---|---|---|---|---|
| 1 | −5.330 | 4.583 | 1.79175 | 1.79092 | 1.79013 |
| 2 | −7.504 | 2.500 | | | |
| 3 | 8.693 | 4.333 | 1.58302 | 1.58252 | 1.58205 |
| 4* | −111.888 | | | | |

NA = 0.30   f' = 10   $f_1$ = −337.07   $f_2$ = 13.42

Aspherical and DOE coefficients of surface #4:

| | | | |
|---|---|---|---|
| k = | 1.0029 | $b_1 =$ | $-1.6069 \times 10$ |
| $a_4 =$ | $3.3910 \times 10^{-4}$ | $b_2 =$ | $3.1434 \times 10^{-3}$ |
| $a_6 =$ | $-1.4141 \times 10^{-6}$ | $b_3 =$ | $-2.8091 \times 10^{-5}$ |
| $a_8 =$ | $5.2720 \times 10^{-8}$ | | |
| $a_{10} =$ | $-6.8888 \times 10^{-10}$ | | |

FIGS. 10A–10F show the spherical aberration, astigmatism, distortion, lateral color, phase difference function $\Phi(y)$, and slope of $\Phi(y)$, respectively, of the collimator lens of Embodiment 7.

EMBODIMENT 8

The collimator lens 1 relating to Embodiment 8 is constructed approximately the same as in Embodiment 2, however, both surfaces of the second lens element $L_2$ in Embodiment 8 are made to be aspherical DOE surfaces.

Table 8 below lists the surface number #, in order from the collimated light side of the collimator lens, the radius of curvature R (in mm) of each lens element surface, the spacing D (in mm) between the surfaces, as well as the refractive index N at the wavelengths 760 nm, 780 nm and 800 nm. The surfaces with a * to the right of the surface number are aspheric, DOE surfaces. In the middle portion of the table, are listed the numerical aperture NA, the focal length f' of the collimator lens, the focal length $f_1$ of the first lens element in order from the collimated light side, and the focal length $f_2$ of the second lens element in order from the collimated light side. In the lower portion of the table are listed the values of k, $a_4$, $a_6$, $a_8$, and $a_{10}$, as well as the values of the coefficients $b_1$, $b_2$, and $b_3$ for Equations (1) and (2) above relating to surfaces #3 and #4.

TABLE 8

| # | R | D | N<760 nm> | N<780 nm> | N<800 nm> |
|---|---|---|---|---|---|
| 1 | −7.310 | 4.167 | 1.76279 | 1.76202 | 1.76129 |
| 2 | −16.105 | 2.205 | | | |
| 3* | 10.762 | 3.833 | 1.58302 | 1.58252 | 1.58205 |
| 4* | −10.668 | | | | |

NA = 0.30    f' = 10    $f_1$ = −22.09    $f_2$ = 9.64

| Aspherical and DOE coefficients of surface #3: | | Aspherical and DOE coefficients of Surface #4: | |
|---|---|---|---|
| k = | 1.0303 | k = | $9.4924 \times 10^{-1}$ |
| $a_4$ = | $-2.4556 \times 10^{-4}$ | $a_4$ = | $2.5614 \times 10^{-4}$ |
| $a_6$ = | $-6.4251 \times 10^{-7}$ | $a_6$ = | $-8.5583 \times 10^{-7}$ |
| $a_8$ = | $-4.8167 \times 10^{-9}$ | $a_8$ = | $-6.7217 \times 10^{-8}$ |
| $a_{10}$ = | $-3.9804 \times 10^{-9}$ | $a_{10}$ = | $-1.7498 \times 10^{-9}$ |
| $b_1$ = | $-5.5920 \times 10$ | $b_1$ = | $-4.5509 \times 10$ |
| $b_2$ = | $5.9855 \times 10^{-3}$ | $b_2$ = | $2.9884 \times 10^{-3}$ |
| $b_3$ = | $1.1597 \times 10^{-5}$ | $b_3$ = | $6.2177 \times 10^{-6}$ |

Figures 11E, 11F:
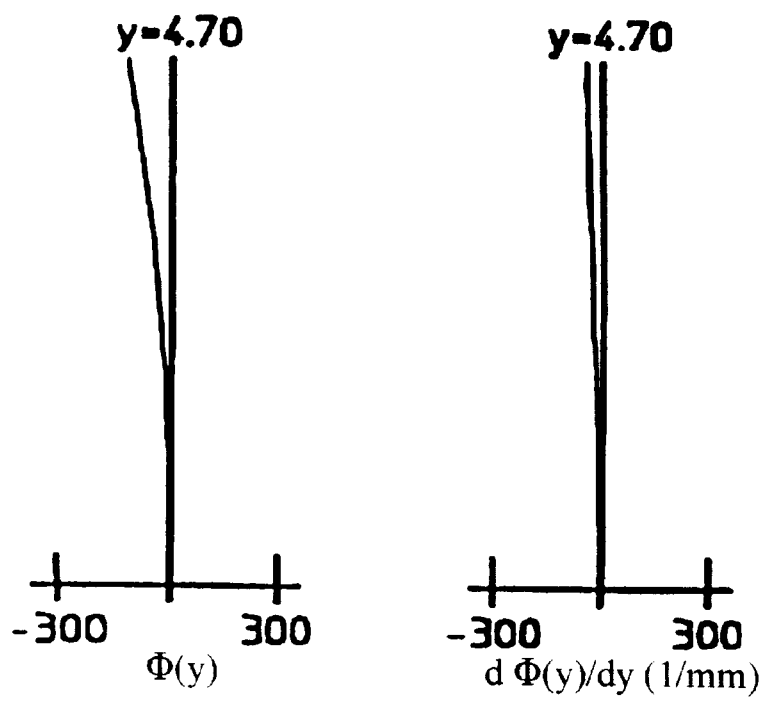
FIGS. 11E & 11F show the phase difference function $\Phi(y)$, and the slope of $\Phi(y)$ of surface #3 of the collimator lens of Embodiment 8; and, FIGS. 11G & 11H show the phase difference function $\Phi(y)$, and the slope of $\Phi(y)$ of surface #4 of the collimator lens of Embodiment 8.
Figures 11G, 11H:
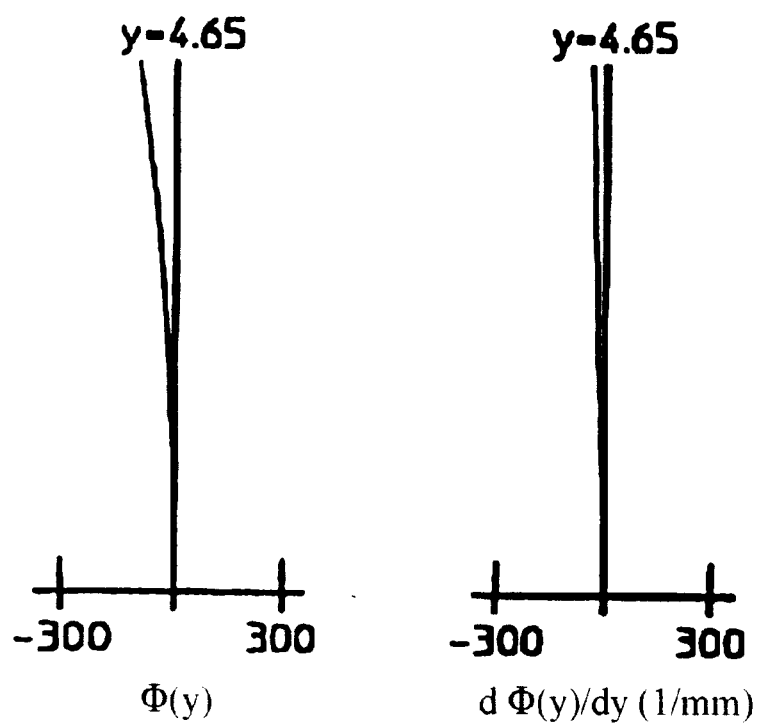
FIGS. 11A–11D show the spherical aberration, astigmatism, distortion, and lateral color, respectively, of the collimator lens of Embodiment 8.

FIGS. 11A–11D show the spherical aberration, astigmatism, distortion, and lateral color, respectively, of the collimator lens of Embodiment 8. FIGS. 11E & 11F show the phase difference function Φ(y) and the slope of Φ(y), respectively, of surface #3 of this embodiment, and FIGS. 11G & 11H show the phase difference function Φ(y) and the slope of Φ(y), respectively, of surface #4 of this embodiment.

In each of the above embodiments, the aberration diagrams have been computed with a glass plate having an index of refraction that equals 1.51, and a thickness of 0.417 mm inserted on the light source side of the collimator lens. In addition, in the various aberration diagrams, (o is the half-picture angle. In FIGS. 4B, 5B, 6B, 7B, 8B, 9B, 10B, and 11B, the astigmatism is shown for the sagittal (S) and tangential (T) planes.

As is clear from these aberration curves, the aberrations are favorably corrected for each embodiment of the invention. Further, each embodiment satisfies Condition (1).

The invention being thus described, it will be obvious that the same may be varied in many ways. For example, the radius of curvature R of each lens element, and the spacing D between the lens elements may be readily scaled to obtain a collimator lens of a desired focal length. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A collimator lens consisting of two lens elements which are fixed in position, wherein the surface of the collimator lens nearest the collimated light side is concave, and at least one of the two lens elements includes an aspherical surface having diffraction optical element zones thereon which provide dispersion of opposite sign to the dispersion provided by refraction of light by the lens element on which said zones are formed.

2. The collimator lens of claim 1 wherein, in order from the collimated light side of the collimator lens, the first lens element has negative refractive power, and the second lens element has positive refractive power.

3. The collimator lens of claim 1 wherein, in order from the collimated light side of the collimator lens, the first lens element has positive refractive power, and the second lens element has positive refractive power.

4. The collimator lens of claim 3, wherein the first lens element has stronger refractive power than the second lens element.

5. The collimator lens of claim 1, wherein the following condition is satisfied:

$$|d\Phi(y)/dy| < 300$$

where $|d\Phi(y)/dy|$ is the absolute value of the slope of Φ(y), with Φ(y) being a phase difference function defined by the equation $$\Phi(y) = b_1 y^2 + b_2 y^4 + b_3 y^6$$

where

Φ(y) is the phase difference function of the DOE surface, y is the distance from the optical axis, and $b_1$, $b_2$, and $b_3$ are coefficients.

6. The collimator lens of claim 2, wherein the following condition is satisfied:

$$|d\Phi(y)/dy| < 300$$

where $|d\Phi(y)/dy|$ is the absolute value of the slope of Φ(y), with Φ(y) being a phase difference function defined by the equation $$\Phi(y) = b_1 y^2 + b_2 y^4 + b_3 y^6$$

where

Φ(y) is the phase difference function of the DOE surface, y is the distance from the optical axis, and $b_1$, $b_2$, and $b_3$ are coefficients.

7. The collimator lens of claim 3, wherein the following condition is satisfied:

$$|d\Phi(y)/dy| < 300$$

where $|d\Phi(y)/dy|$ is the absolute value of the slope of Φ(y), with Φ(y) being a phase difference function defined by the equation $$\Phi(y) = b_1 y^2 + b_2 y^4 + b_3 y^6$$

where

Φ(y) is the phase difference function of the DOE surface, y is the distance from the optical axis, and $b_1$, $b_2$, and $b_3$ are coefficients.

8. The collimator lens of claim 4, wherein the following condition is satisfied:

$$|d\Phi(y)/dy| < 300$$

where $|d\Phi(y)/dy|$ is the absolute value of the slope of Φ(y), with Φ(y) being a phase difference function defined by the equation $$\Phi(y) = b_1 y^2 + b_2 y^4 + b_3 y^6$$

where

Φ(y) is the phase difference function of the DOE surface, y is the distance from the optical axis, and $b_1$, $b_2$, and $b_3$ are coefficients.

9. The collimator lens of claim 1, in combination with an optical scanning device that includes a rotating mirror.

10. The collimator lens of claim 2, in combination with an optical scanning device that includes a rotating mirror.

11. The collimator lens of claim 3, in combination with an optical scanning device that includes a rotating mirror.

12. The collimator lens of claim 4, in combination with an optical scanning device that includes a rotating mirror.

13. The collimator lens of claim 5, in combination with an optical scanning device that includes a rotating mirror.

* * * * *

UNITED STATES PATENT AND TRADEMARK OFFICE
CERTIFICATE OF CORRECTION

PATENT NO.    : 6,324,013 B1
DATED         : November 27, 2001
INVENTOR(S)   : Nakai It is certified that error appears in the above-identified patent and that said Letters Patent is hereby corrected as shown below:

Column 1,
Line 20, change "f 0" to -- f $\dot{}\theta$ --;
Line 30, change "so" to -- $\omega$ --;

Column 3,
Line 6, change "provide" to -- provides --;

Column 4,
Change lines 2 and 3 to:
-- $Z = (\Phi(y) \pm 2n\pi) \cdot (\lambda / (2\pi(N-1))) + (y^2 / r) / (1 + (1-ky^2/r^2)^{1/2}) + a_4 y^4 + a_6 y^6 + a_8 y^8 + a_{10} y^{10}$   Equation (2) --;

Column 5,
Line 61, delete the comma after "table";

Column 6,
Line 23, change "the 15 phase" to -- the phase --;

Column 9,
Line 31, delete the comma after "table";

Column 10,
Line 22, delete "surface #3 and";
Line 60, delete the comma after "table"; and, Column 11,
Line 33, change "diagrams, (o is the" to -- diagrams, $\omega$ is the --.

Signed and Sealed this

Thirtieth Day of April, 2002

Attest:

*Attesting Officer*

JAMES E. ROGAN
*Director of the United States Patent and Trademark Office*